M. A. POSSONS.
LIGHTING DEVICE FOR GAS STOVES.
APPLICATION FILED SEPT. 29, 1913.
Patented Apr. 20, 1915.
3 SHEETS—SHEET 1.
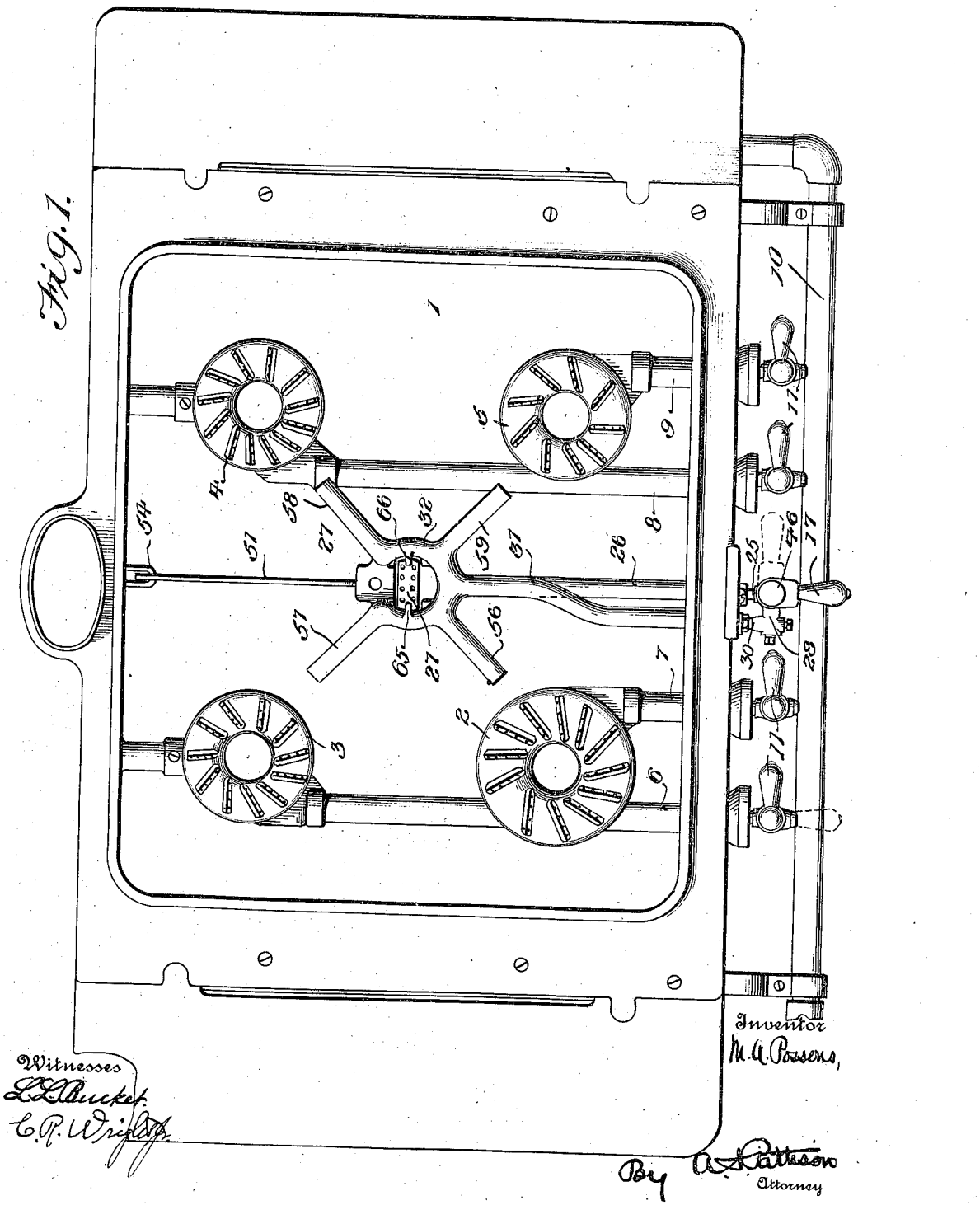

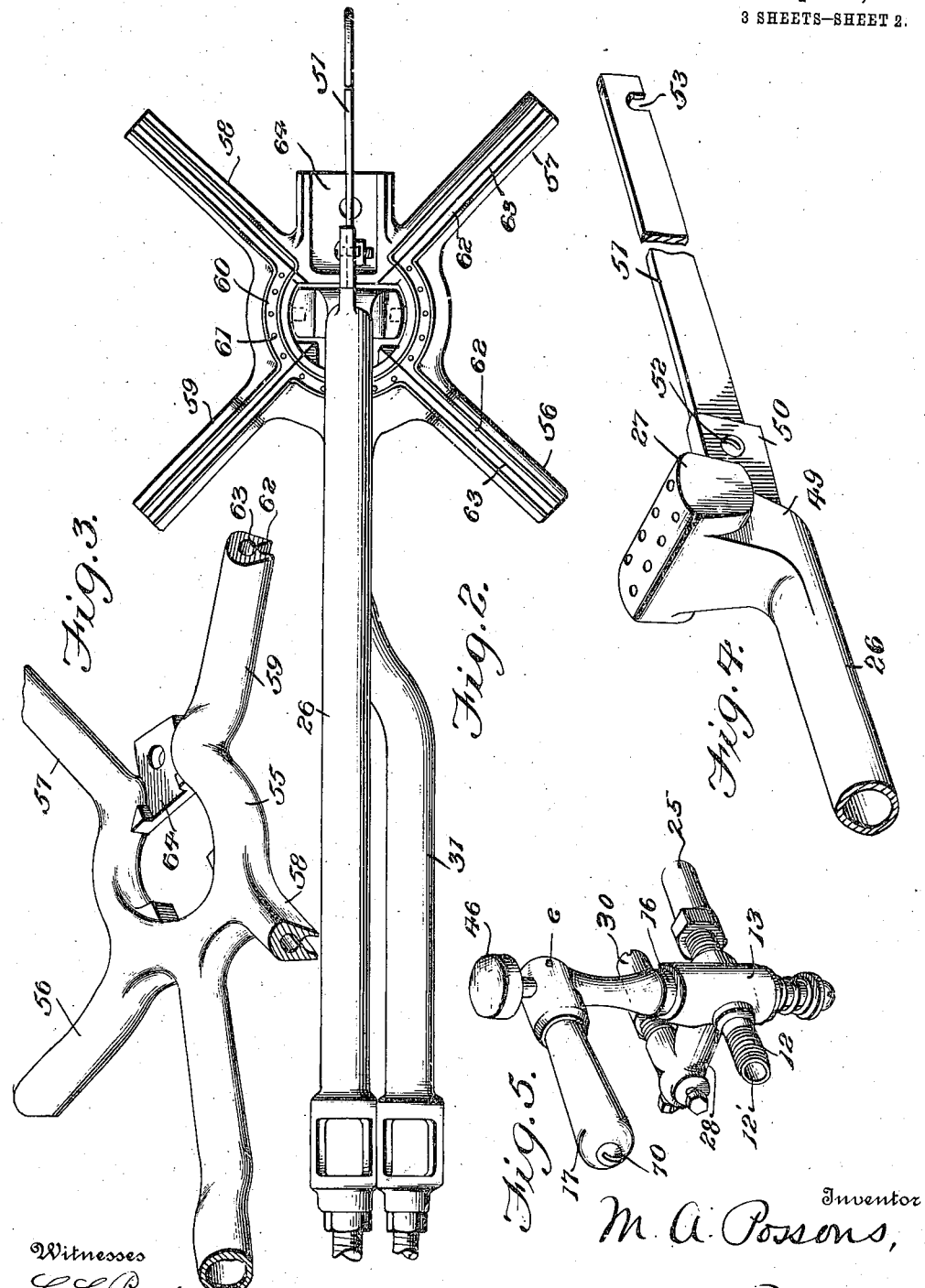

M. A. POSSONS.
LIGHTING DEVICE FOR GAS STOVES.
APPLICATION FILED SEPT. 29, 1913.
1,136,717.
Patented Apr. 20, 1915.
3 SHEETS—SHEET 3.
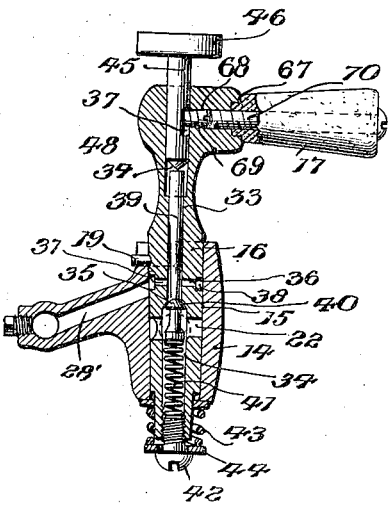
Fig. 6.
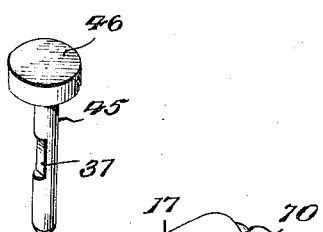
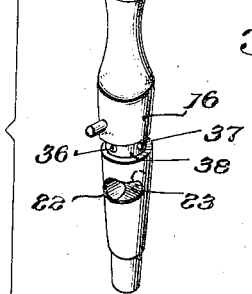
Fig. 7.
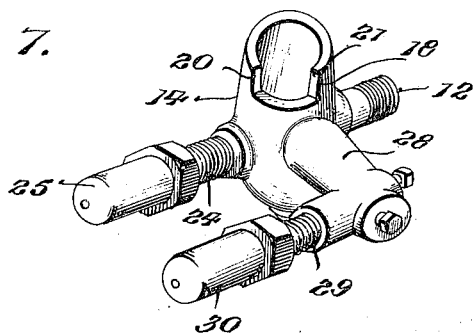
Fig. 8.
Witnesses
Inventor
M. A. Possons,
By A. S. Pattison.
Attorney

UNITED STATES PATENT OFFICE.

MINARD A. POSSONS, OF CLEVELAND, OHIO, ASSIGNOR TO AMERICAN STOVE COMPANY, OF ST. LOUIS, MISSOURI, A CORPORATION OF NEW JERSEY.

LIGHTING DEVICE FOR GAS-STOVES.

1,136,717.  Specification of Letters Patent.  Patented Apr. 20, 1915.

Application filed September 29, 1913. Serial No. 792,510.

*To all whom it may concern:*

Be it known that I, MINARD A. POSSONS, a citizen of the United States, residing at Cleveland, in the county of Cuyahoga and State of Ohio, have invented certain new and useful Improvements in Lighting Devices for Gas-Stoves, of which the following is a specification, reference being had therein to the accompanying drawings.

My invention relates to improvements in lighting devices for gas stoves.

The object of my invention is to provide a lighting device which can be readily applied to the ordinary gas-stove and in which all the burners can be readily lighted from the simmering burner, or in which any one burner can be lighted. The arrangement is also such that all of the burners, or any one of the burners may be lighted from any one of the other burners when the simmering burner is extinguished.

A further object of my invention is to provide means whereby the gas supplied to the lighter is more readily controlled so that when the burners have been lighted by the lighter the gas is automatically cut off from the lighter and which at the same time provides means whereby the gas can be supplied to the lighter when it is cut off from the simmering burner.

A still further object of my invention is to provide a simple, cheap and effective lighter of this character having certain details of structure and combination of parts to accomplish the above results, as will be hereinafter more fully described.

In the accompanying drawings—Figure 1 is a top plan view of a four burner gas stove showing my improved lighting device applied thereto. Fig. 2 is an enlarged bottom plan view of the lighting device and simmering burner in their relative position. Fig. 3 is an enlarged perspective view of the lighting member proper, partly broken away. Fig. 4 is an enlarged perspective view of the simmering burner and the supporting means therefor. Fig. 5 is a perspective view of my improved valve in an open position. Fig. 6 is a vertical transverse sectional view of Fig. 5. Fig. 7 is a perspective view of the turning plug removed and also showing the spring pressed valve for controlling the gas to the lighting device removed. Fig. 8 is a perspective view of a valve casing looking in the opposite direction from that shown in Fig. 5, and showing the turning plug removed.

Referring now to the drawings, 1 represents the upper end or top cooking surface of the ordinary gas stove having four burners 2, 3, 4 and 5 arranged as shown and supplied with gas by means of the pipes 6, 7, 8, and 9, connected to the common gas-supply pipe 10, and a supply of gas to the said burners from the pipe 10 controlled by valves 11, all of which is of the ordinary construction and needs no further description. As shown, there are four valves 11, one for each burner, and whereby each burner may be independently supplied with gas from the common gas supply pipe 10.

The common gas supply pipe 10, midway between the pipes 7 and 8, is provided with a tap into which is screwed the threaded extension 12 of my improved turning plug 13, and whereby the turning plug is supplied with gas. The turning plug 13, as shown, consists of an approximately cylindrical body portion 14, having a bore 15, extending vertically therethrough from the top to the bottom and in which is fitted the plug 16, which is also tapered and corresponds with the taper of the bore 15 of the body portion 14. The upper end of the plug 16 is provided with the usual handle 17, whereby the plug 16 is turned in the cylindrical body-portion 14. The upper end of the body-portion 14 is cut away, as indicated at 18, and the plug 16 carries the pin 19 working in said cut-away portion, said pin serving as a stop to limit the oscillation of the plug within the body-portion. The pin 19 engages the vertical walls 20 and 21 of the cut-away portion and stops the plug in either the open or closed position, as will be hereinafter more fully described. The plug 16 is provided with an opening 22 extending transversely therethrough and said opening is adapted to register with the opening 12' in the extension 12, whereby the gas is allowed to pass through the plug. The periphery of the plug 16 is provided with recess 23 extending circumferentially around the plug, as clearly shown in Fig. 7 of the drawings.

The central body-portion 14 of the plug, opposite the extension 12, is provided with a hollow extension 24 which is adapted to register with the transverse opening 22 in the plug, and whereby the gas passes from the main gas supply to the extension 24, and is fed therefrom through the nozzle 25 into the end of the pipe 26 carrying the simmering burner 27.

The body-portion 14 of the turning plug is provided at one side with a lateral extension 28, which extends at right angles to the extensions 12 and 24, and has an opening 28' therethrough communicating with the bore 15 of the body-portion 14, of the turning plug. The outer end of the extension 28 is turned laterally at 29 and extends parallel with the extension 24 and in a horizontal plane therewith. The extension 29 is provided with a nozzle 30, which communicates with the pipe 31 of my improved lighting device proper 32. The turning plug proper 16 is provided with a vertical opening 33 therethrough, and starting from its upper end and about midway between the top and bottom is enlarged as indicated at 34. This enlargement of the opening through the turning plug forms a valve seat 35. This seat, as shown, is a short distance above the transverse opening 22 in the plug. The opening 34, as heretofore stated and as fully shown in Fig. 6 of the drawing, extends downwardly through the plug intersecting the opening 22 and communicating with the extreme lower end of the plug. The plug 16, above the valve seat 35, is provided with two transverse openings 36 and 37 intersecting the central vertical opening and communicating at their outer ends with a circumferential groove 38, whereby the opening 33 through the plug is at all times in communication with the circumferential groove 38. The opening 28' through the extension 28 is at all times in communication with the circumferential groove 38, whereby the gas may be admitted to the opening 28' when the plug 16 is in either a closed or open position, as will be later described.

Within the opening 33 of the plug 16 is a valve stem 39 having a valve 40 resting against the valve seat 35, and said valve and valve stem normally held upward against the seat by means of the spring 41. The spring 41 is held within the enlarged opening 34 of the plug by means of the screw 42 and the tension of the spring 41 normally holding the valve seated. This screw 42, as shown, is screwed into the lower end of the plug 16 and carries a washer 44 against which bears a coiled spring 43, which has its upper end bearing against the lower end of the body-portion 14 of the cock and normally forces the plug 16 in a downward position in order to have it closely fit the bore 15 to prevent any escape of gas therefrom.

The upper end of the valve stem 39 terminates some distance from the upper end of the plug and extending downwardly through the plug is a stem 45 having at its upper end the enlarged button 46, and its lower end adapted to engage the upper end of the valve stem. By pressure upon the button 46 it will be seen that the valve stem will be forced downwardly and the valve 40 unseated so as to allow the gas to pass around the valve 40 through the openings 36 and 37 into the circumferential groove 38 and into the passage 28' and thence to the lighter 32 through the pipe 31.

The transverse opening 22 in the plug 16, as heretofore described, is adapted to allow the gas to pass from the extension 12 into the extension 24 for supplying the simmering burner with the necessary gas. When the turning plug is turned with the handle transverse the extension 24, it will be seen that the cut-away portion 23 communicates with the opening through the extension or main gas supply 12, and thus allows the enlarged vertical opening 34 in the turning plug 16 to at times be supplied with gas. By this structure it will be seen that no matter what the position the plug is in by pushing down upon the button 46 the valve 40 is unseated from the valve seat 35 and gas is supplied to the passage 28' leading to the lighting device 32. The stem 45 of the button 46 is provided with a cutaway portion 37. The body-portion of the plug is provided with a recess 67 and communicating with said recess is a screw threaded opening 68, which intersects the bore of the body-portion at a point opposite the cut-away portion 37 of the stem 45. Screwed within the threaded opening 68 is a blind-screw 69, which enters the cutaway portion 37, and limits the movement of the stem 45, as will be readily understood. The handle 17 is made of porcelain and fits within the recess 67 and a screw 70 passes through the handle and is screwed within the outer end of the screw-threaded opening 68, whereby the handle is removably carried by the plug. This removal of the handle enables the blind-screw 69 to be adjusted or moved outwardly when it is desired to remove the stem 45.

The pipe 26, as heretofore stated, carries at its outer end the simmering burner 27. This simmering burner, as shown, is formed integral with the upwardly turned end 49 of the pipe 26 and is of an elongated form extending transverse the pipe. The opposite face of the simmering burner is provided with an extension 50, formed integral therewith and to which is bolted a plate 51, by means of the bolt 52. This plate, as shown, is arranged on the edge and is provided at its outer end with a notch 53 adapted to hook over the loop 54, carried by the stove, and whereby the simmering burner is supported in its proper position. The tube 31 has the lighting device 32 formed integral therewith. This lighting device consists of a circular portion 55 having four radially extending arms 56, 57, 58 and 59 also formed integral therewith. The lower face of the circular portion 55 is provided with a groove 60 having a series of openings 61, communicating with said groove 60 and with the circular hollow portion which communicates with the pipe 31 and whereby gas is supplied thereto. The radial arms 56, 57, 58 and 59 are hollow, as shown, and communicate with the portion 55, whereby gas is also supplied to said radial arms and are provided with grooves 62 having slots 63 communicating with the grooves and with the central bore of said arms. The portion 55, as clearly shown in Figs. 2 and 3 of the drawings does not form a complete circle, but the ends thereof are connected by a web 64 for supporting a lighter when not used in connection with the simmering burner. The circular portion 55 of the lighter, as shown in Fig. 1, of the drawings, is provided with the inwardly extending lugs 65 and 66, which rest upon the upper face of the simmering burner and whereby the lighting device is readily supported.

In operation when it is desired to light the several burners 2, 3, 4 and 5, the simmering burner is first lighted, the valve 17 being turned in the position shown in solid lines in Fig. 1. The gas is next turned on to any one or all the burners which are desired to be lighted and upon pushing down upon the button 46, the gas is allowed to flow into the pipe 31, as heretofore described and the gas from the simmering burner ignites the gas as it is discharged from the slots 63 in the radial arms and a flame burns from the lower face of each and all of the radial arms and also from the lower face of the portion 55 of the lighting device. The arms 56, 57, 58 and 59 extend adjacent the burners 2, 3, 4 and 5 and thus ignite the same.

When it is not desired to use the simmering burner, one of the burners is first lighted in the usual manner. The valve of the simmering burner being in the position shown in dotted lines of Fig. 1, all that is necessary to light the other burners is to push down upon the button 46 which allows the lighting device to be supplied with gas and said lighting device is ignited from the lighted burner and the flame conveyed across to one or all of the burners to which the gas is supplied.

The drawings show one expression of my invention, but it will be understood that the structure could be readily changed without departing from the invention.

Having thus described my invention, what I claim and desire to secure by Letters Patent is—

1. In a stove having a series of main burners, the combination of a simmering burner between the main burners, a valve for each main burner, a lighter between the burners and adjacent the simmering burner, a valve plug controlling the gas supply to the simmering burner, and means carried by the valve plug for supplying the lighter with gas when the valve plug is open or closed in respect to the simmering burner.

2. The combination with a gas stove having a series of burners, of a simmering burner, a lighter adjacent the simmering burner and having radial arms extending outwardly adjacent the burners, a valve controlling the gas supply to the simmering burner and to the lighter, and means within the valve for supplying the lighter with gas when the valve is open or closed.

3. The combination with a stove having a series of burners, of a simmering burner, a lighter adjacent the simmering burner and having radial arms extending outwardly adjacent the burners, a valve controlling the gas to the simmering burner, and a valve within the first-mentioned valve for controlling the gas to the lighter when the first mentioned valve is opened or closed.

4. The combination with a gas stove having a series of burners, of a simmering burner, a lighter adjacent the simmering burner, a turning plug controlling the gas to the simmering burner, and a spring pressed valve within the turning plug for controlling the gas to the lighter when the turning plug is open or closed.

5. The combination with a gas stove having a series of burners, of a simmering burner, a lighter adjacent the simmering burner, a turning plug controlling the gas to the simmering burner, a by-pass connected to the turning plug and supplying gas to the lighter, and a spring-pressed valve within the turning plug and controlling the gas supply to the lighter when the turning plug is open or closed.

6. The combination with a gas stove having a series of burners, of a simmering burner, a lighter adjacent the simmering burner, a turning plug controlling the gas supply to the simmering burner, a by-pass connected to the turning plug and supplying the lighter with gas, a spring-pressed valve within the turning plug and normally closing the by-pass, and means whereby the valve within the turning plug may be opened whereby gas is supplied to the lighter when the turning plug is open or closed.

7. The combination with a gas stove having a series of burners, of a simmering burner, a lighter adjacent the simmering burner, a casing having an inlet and outlet on opposite sides, a plug within said casing and having a passage therethrough to form a communication between the inlet and outlet passages for supplying the simmering burner with gas, said plug having a central passage extending vertically through and intersecting the transverse gas passage, said plug having a peripheral groove, radially extending openings communicating with the upper end of the central passage and having their outer ends communicating with the peripheral groove, said casing having a discharge opening at all times communicating with the peripheral groove and adapted to supply gas to the lighter, and a spring-pressed valve controlling the communication between the transverse opening and the vertical opening below the radially extending opening.

8. The combination with a gas stove having a series of burners, of a simmering burner, a lighter adjacent the simmering burner, a casing having an inlet and outlet on opposite sides, the said outlet adapted to supply gas to the simmering burner, a second outlet opening extending at right angles to the first outlet opening in the horizontal plane of the same, a turning plug within the casing and having a passage therethrough adapted to communicate with the inlet and first-mentioned outlet, and a spring-pressed valve within the plug and adapted to control the gas supply to the second-mentioned outlet when the turning plug is open or closed.

9. The combination with a gas stove having a series of burners, of a simmering burner, a lighter adjacent the simmering burner, a casing having an inlet and outlet opening, said outlet opening adapted to supply gas to the simmering burner, a second outlet opening in the horizontal plane of the first-mentioned outlet opening, a turning plug within the casing and controlling the first-mentioned outlet, and a spring pressed valve within the turning plug, and adapted to allow gas to pass from the second-mentioned outlet to the lighter when the turning plug is either open or closed.

10. The combination with a gas stove having a series of burners, of a simmering burner, a lighter adjacent the simmering burner, a turning plug controlling the gas supply to the simmering burner, and the lighter, and a valve controlling the outlet to the lighter, whereby the gas can be discharged from said opening when the turning plug is open or closed.

11. The combination with a gas-stove, having a series of burners, of a tube extending inwardly between the burners and having a simmering burner at its inner end between the burners, an arm carried by the opposite side of the simmering burner and supported at its outer end by the frame of the stove, a lighter surrounding the simmering burner on three sides and having inwardly extending lugs resting upon the upper face of the simmering burner for supporting the same, a gas supply tube for said lighter, and radially extending arms formed as a part of the lighter and in communication therewith and extending adjacent the burners.

12. The combination with a gas stove having a series of burners, of a tube extending inwardly and having a simmering burner at its inner end between the burners, an arm carried by the opposite side of the simmering burner and supported by the frame of the stove, a second tube extending inwardly and above the first mentioned tube and having a circular member in communication therewith and supported by the simmering burner, said member having radially extending hollow arms in communication therewith and extending adjacent the series of burners, the lower face of said member having an inverted U-shaped groove provided with a series of openings, and the lower face of the said radially extending arms having vertical slits extending throughout their length and intersecting the said member, and means for independently supplying the simmering burner and the lighter with gas.

13. The combination with a gas stove having a series of burners, of a tube extending inwardly from one side and having an upwardly turned end, a simmering burner carried by the upwardly turned end of said tube, a lighter comprising a tube extending inwardly and a circular member in communication with said tube and surrounding the simmering burner on three sides and supported thereby, radially extending arms extending adjacent the burners and in communication with the circular member, and means carried by the lower face of the said member and the radial arms for conveying the flame from the simmering burner outwardly to the ends of the radial arms or conveying the flame from one end of the radial arm inwardly and around the said member to the outer ends of the other radial arms for the purpose described.

14. The combination with a gas stove having a series of burners, of a simmering burner, a lighter, a casing having an inlet and outlet opening on opposite sides, said outlet opening leading to the simmering burner, said casing having a second outlet at right angles to the first outlet and leading to the lighter, a turning plug within the casing and having a transverse passage therethrough and adapted to communicate with the inlet and first-mentioned outlet opening, said plug having a groove on one side communicating with the passage-way therethrough, whereby the inlet passage is at all times in communication with the transverse passage of the plug, said plug having a vertical bore therethrough intersecting the transverse passage, said plug having a peripheral groove, a radially extending passage in the plug above the transverse passage and communicating with the central bore and having its outer ends in communication with the peripheral groove in the plug, a valve intermediate the transverse passage and the radial passage for controlling the second-mentioned outlet opening leading to the lighter, and a valve stem extending upwardly from the upper end of the plug and having a spring for normally holding the valve closed, whereby the second outlet opening of the casing leading to the lighter can be supplied with gas when the plug for controlling the simmering burner is open or closed.

15. The combination with a gas stove having a series of burners, of a simmering burner, a lighter adjacent the simmering burner, a casing having an inlet and outlet opening, said outlet opening supplying gas to the simmering burner, said casing having a second outlet opening supplying gas to the lighter in a horizontal plane with the first-mentioned outlet opening, a turning plug within the casing controlling the first-mentioned outlet opening, a spring valve within the turning plug and adapted to allow gas to pass from the second mentioned outlet opening to the lighter when the turning plug controlling the gas to the simmering burner is either open or closed, a button having a stem extending downwardly through the plug and engaging the spring-pressed valve, said stem having a cut-away portion, the plug opposite said cut-away portion having a screw-threaded opening, a blind screw within said opening, and entering the cut-away portion of the stem, and a handle having a screw entering said screw-threaded opening in the plug substantially as shown and described.

In testimony whereof I hereunto affix my signature in the presence of two witnesses.

MINARD A. POSSONS.

Witnesses:
  F. T. BATCHELOR,
  E. A. SCHNEIDER.